United States Patent
Lindsey

(10) Patent No.: US 6,834,899 B2
(45) Date of Patent: Dec. 28, 2004

(54) BUMPER ASSEMBLY THAT PROVIDES EARLY CRASH DETECTION

(75) Inventor: David W. Lindsey, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/395,451

(22) Filed: Mar. 24, 2003

(65) Prior Publication Data
US 2004/0189024 A1 Sep. 30, 2004

(51) Int. Cl.$^7$ .............................................. B60R 21/00
(52) U.S. Cl. ...................................... 293/118; 293/119
(58) Field of Search ................................ 293/118, 119, 293/187.09

(56) References Cited

U.S. PATENT DOCUMENTS

| | | | |
|---|---|---|---|
| 3,853,199 A | * | 12/1974 | Hirashima et al. |
| 3,992,047 A | | 11/1976 | Barényi et al. |
| 4,026,590 A | | 5/1977 | Holm |
| 4,360,228 A | | 11/1982 | Rasmussen et al. |
| 4,514,002 A | | 4/1985 | McIntosh |
| 4,582,351 A | | 4/1986 | Edwards |
| 4,932,697 A | | 6/1990 | Hun |
| 5,052,732 A | | 10/1991 | Oplet et al. |
| 5,370,429 A | | 12/1994 | Reuber et al. |
| 5,520,428 A | | 5/1996 | Bell |
| 5,624,143 A | | 4/1997 | Waldschmitt |
| 5,632,518 A | | 5/1997 | Kendall |
| 5,727,826 A | | 3/1998 | Frank et al. |
| 5,810,427 A | | 9/1998 | Hartmann et al. |
| 5,967,573 A | | 10/1999 | Wang |
| 6,057,797 A | | 5/2000 | Wagner |
| 6,089,628 A | | 7/2000 | Schuster |
| 6,183,025 B1 | | 2/2001 | Hope et al. |
| 6,183,042 B1 | | 2/2001 | Unrath |
| 6,264,258 B1 | | 7/2001 | Li et al. |
| 6,340,142 B1 | | 1/2002 | Li |
| 6,371,540 B1 | | 4/2002 | Campanella et al. |
| 6,474,489 B2 | | 11/2002 | Payne et al. |
| 2002/0033755 A1 | * | 3/2002 | Ishizaki et al. .............. 340/436 |

FOREIGN PATENT DOCUMENTS

| | | |
|---|---|---|
| DE | 4 131 734 | 4/1993 |
| EP | 0535175 | 12/1994 |
| WO | WO-01/23225 | 4/2001 |

* cited by examiner

Primary Examiner—Joseph D. Pape
(74) Attorney, Agent, or Firm—Sally J. Brown

(57) ABSTRACT

A bumper assembly having a movable bumper is disclosed. A crash sensor is attached to the movable bumper. A linkage is provided to attach the movable bumper to a motor vehicle. When the movable bumper is attached to the motor vehicle, the linkage permits the movable bumper to be moved from a first position to a second position that is horizontally displaced from the first position in a direction away from the motor vehicle. Extending the bumper in this manner allows the crash sensor to provide early detection of a collision involving the motor vehicle.

21 Claims, 4 Drawing Sheets

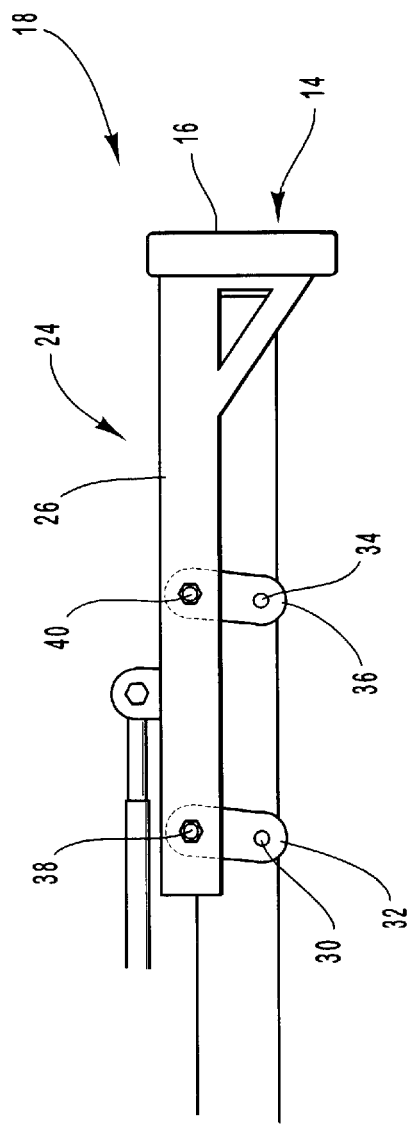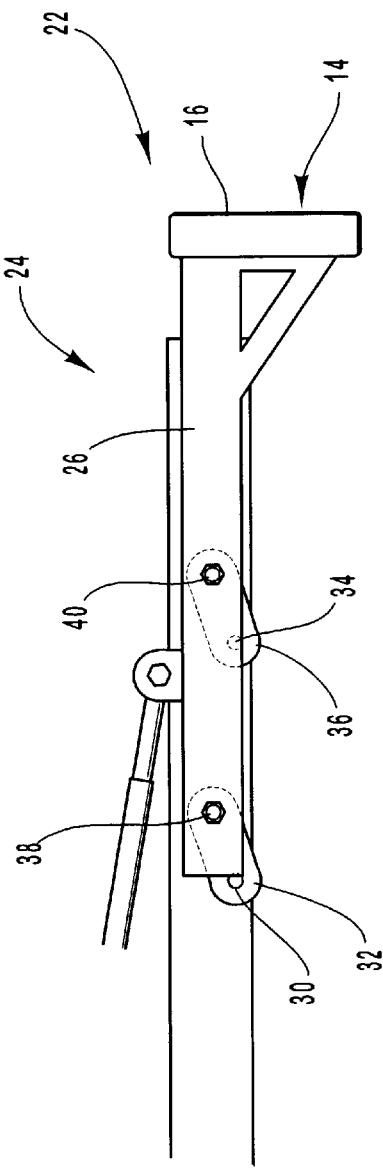

BUMPER ASSEMBLY THAT PROVIDES EARLY CRASH DETECTION

BACKGROUND OF THE INVENTION

1. Field of the Invention

The present invention relates to bumper assemblies for motor vehicles. More specifically, the present invention relates to a bumper assembly that provides early crash detection.

2. Description of Related Art

Motor vehicles are a part of everyday life for most individuals around the world. For example, most people use some type of motor vehicle to transport themselves to and from work, to run errands, to attend recreational events, to visit family members and friends, and so forth. Some people use motor vehicles because they provide more convenient transportation than available alternatives. Others use motor vehicles because they find the experience of driving to be enjoyable. Whatever the reasons behind their popularity, the demand for motor vehicles is unlikely to abate anytime in the near future.

Researchers are constantly trying to find ways to improve various aspects of motor vehicles. One significant area of research relates to motor vehicle safety. Unfortunately, motor vehicle collisions are one of the leading causes of death and injury in the United States. Consequently, efforts are constantly being made to increase the safety of motor vehicles, particularly in a collision situation.

One device which is often used to provide increased safety to the occupants of a motor vehicle during a collision is a bumper assembly. A bumper assembly absorbs at least some of the impact of a collision involving the motor vehicle. Conventional bumper assemblies typically include a stationary bumper that can deform permanently or resiliently during a collision, thereby preventing or reducing the amount of damage to the vehicle frame, adjacent components, and vehicle occupants.

Another device which is sometimes used to provide increased safety to the occupants of a motor vehicle during a collision is a crash sensor. A crash sensor is any device which detects a collision involving the motor vehicle and provides an electrical signal that is indicative thereof. Motor vehicles typically include one or more crash sensors.

Under some circumstances, it may be desirable to detect an impending collision involving a motor vehicle as early as possible. Accordingly, benefits may be realized if a bumper assembly were provided that included means for providing early detection of a collision involving the motor vehicle.

SUMMARY OF THE INVENTION

The apparatus of the present invention has been developed in response to the present state of the art, and in particular, in response to the problems and needs in the art that have not yet been fully solved by currently available bumper assemblies. Thus, a bumper assembly having a movable bumper is disclosed. A crash sensor is attached to the movable bumper. A linkage is provided to attach the movable bumper to a motor vehicle. When the movable bumper is attached to the motor vehicle, the linkage permits the movable bumper to be moved from a first position to a second position that is horizontally displaced from the first position in a direction away from the motor vehicle. Extending the bumper in this manner allows the crash sensor to provide early detection of a collision involving the motor vehicle.

In some embodiments, the second position into which the movable bumper may be moved may also be downwardly displaced from the first position. Lowering the bumper in this manner enables the motor vehicle to engage a target at a lower impact point. This may be advantageous in a collision situation where the striking vehicle is elevated with respect to a target vehicle.

Many different types of linkages may be used. In some embodiments, the linkage may include a shaft that is rigidly attached to the movable bumper and pivotally attachable to a frame of the motor vehicle.

When the crash sensor detects a collision involving the motor vehicle, the crash sensor may effect deployment of a safety device. Many different types of safety devices may be deployed. One example of a safety device that may be deployed is an airbag, such as a driver airbag, a passenger airbag, a side-impact airbag, or the like. Another example of a safety device that may be deployed is an inflatable structure that is located behind the bumper.

The bumper assembly includes an actuator that moves the movable bumper from the first position to the second position. The actuator may be in electronic communication with a speed monitoring unit that monitors the speed of the motor vehicle. In some embodiments, when the speed of the motor vehicle increases above a threshold value, the speed monitoring unit may cause the actuator to move the bumper from the first position to the second position. When the speed of the motor vehicle decreases below the threshold value, the speed monitoring unit may cause the actuator to move the bumper from the second position back to the first position.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A is a side plan view of an exemplary linkage for attaching the bumper to the motor vehicle;

FIG. 3B is a side plan view of the linkage of FIG. 3A in which the bumper is shown in an activated position;

DETAILED DESCRIPTION

It will be readily understood that the components of the embodiments as generally described and illustrated in the Figures herein could be arranged and designed in a wide variety of different configurations. Thus, the following more detailed description of certain exemplary embodiments of the present invention is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of linkages, inflators, actuators, etc., to provide a thorough understanding of certain embodiments of the invention. One skilled in the art will recognize, however, that the invention can be practiced without one or more of the specific details, or with other components, materials, etc. In other instances, well-known structures, materials, or operations are not shown or described in detail to avoid obscuring aspects of the invention.

Figure 1:
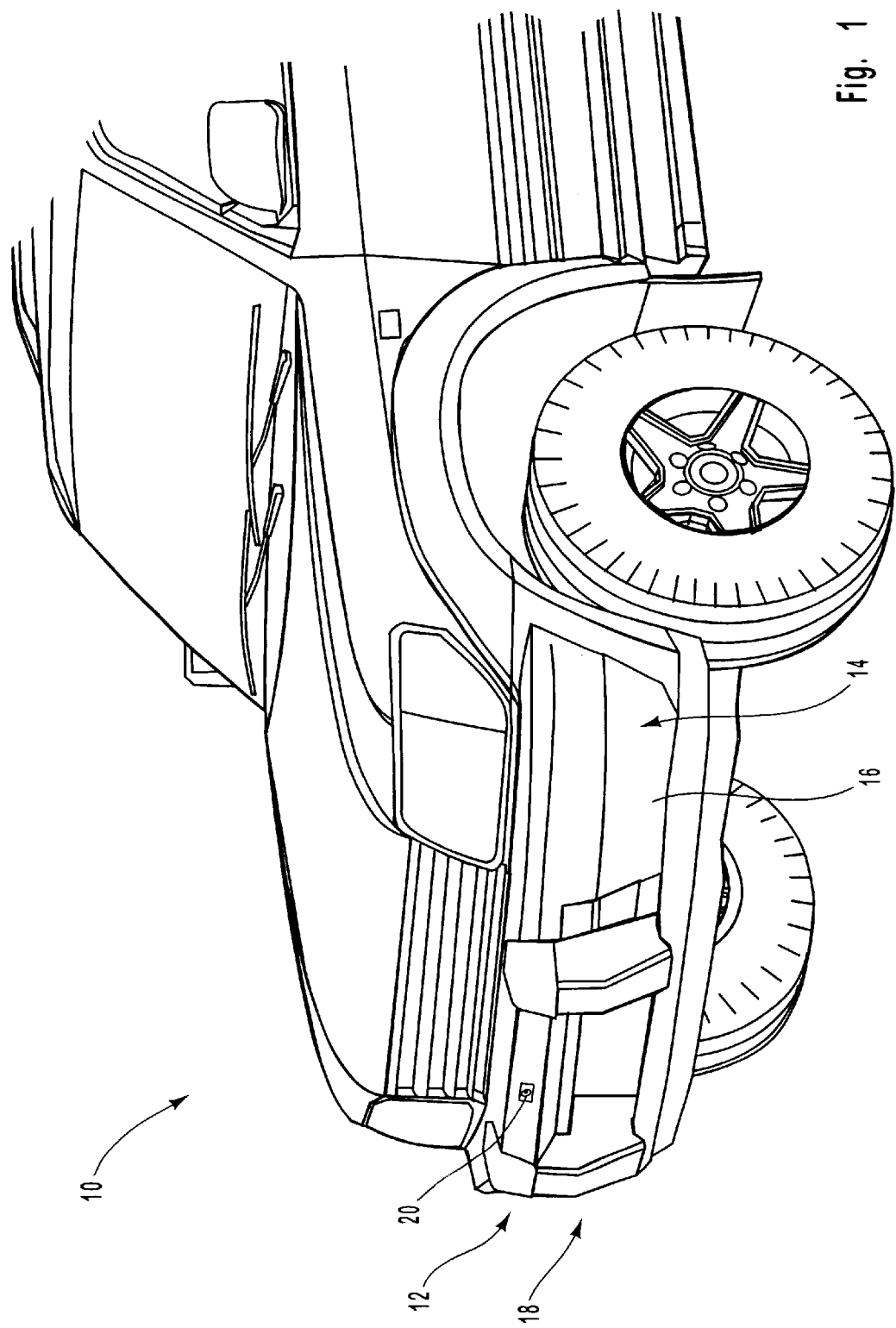
FIG. 1 is a perspective view of a motor vehicle which includes an embodiment of a bumper assembly that provides early crash detection.

FIG. 1 is a perspective view of a motor vehicle 10. The motor vehicle 10 shown in FIG. 1 is a sport utility vehicle (SUV). Of course, embodiments of the invention may be used with other types of motor vehicles 10, including cars, trucks, vans, buses, and the like.

The motor vehicle 10 includes a bumper assembly 12. The bumper assembly 12 is disposed toward the front end of the motor vehicle 10. Alternatively or in addition, the motor vehicle 10 may include a bumper assembly 12 that is disposed toward the rear end of the motor vehicle 10.

The bumper assembly 12 includes a bumper 14. The bumper 14 functions to absorb impact energy and minimize damage to the motor vehicle 10 in the event of a collision. The bumper 14 includes an impact surface 16 that receives the impact of a collision involving the motor vehicle 10.

The bumper assembly 12 also includes a linkage (not shown in FIG. 1) for attaching the bumper 14 to the motor vehicle 10. The linkage typically retains the bumper 14 in a standard position 18 toward the front end of the motor vehicle 10, as shown in FIG. 1. Under some circumstances, the linkage permits the bumper 14 to be moved from the standard position 18. Therefore, the bumper 14 will sometimes be referred to herein as a movable bumper 14.

The bumper assembly 12 also includes a crash sensor 20. The crash sensor 20 is any device which detects a collision involving the motor vehicle 10 and provides an electrical signal that is indicative thereof. A wide variety of crash sensors 20 are known to those skilled in the art. For example, the crash sensor 20 may take the form of an electronic accelerometer. Alternatively, the crash sensor 20 may be an electro-mechanical device that completes an electrical circuit upon detection of sudden deceleration of the motor vehicle 10. For example, the crash sensor 20 may incorporate a ball and magnet design that allows a ball to roll forward to complete an electrical circuit by touching two contacts. Alternatively, the crash sensor 20 may take the form of a spring band and roller design that allows the roller to move forward and close a contact when tension of a spring band is overcome. Alternatively still, the crash sensor 20 may take the form of a rotating weight design that allows a weight to move a rotor against spring tension to a point where contacts complete an electrical circuit. In the embodiment shown in FIG. 1, the crash sensor 20 is attached to the impact surface 16 of the bumper 14. Although a single crash sensor 20 is shown in FIG. 1, more than one crash sensor 20 may be used.

Figure 2:
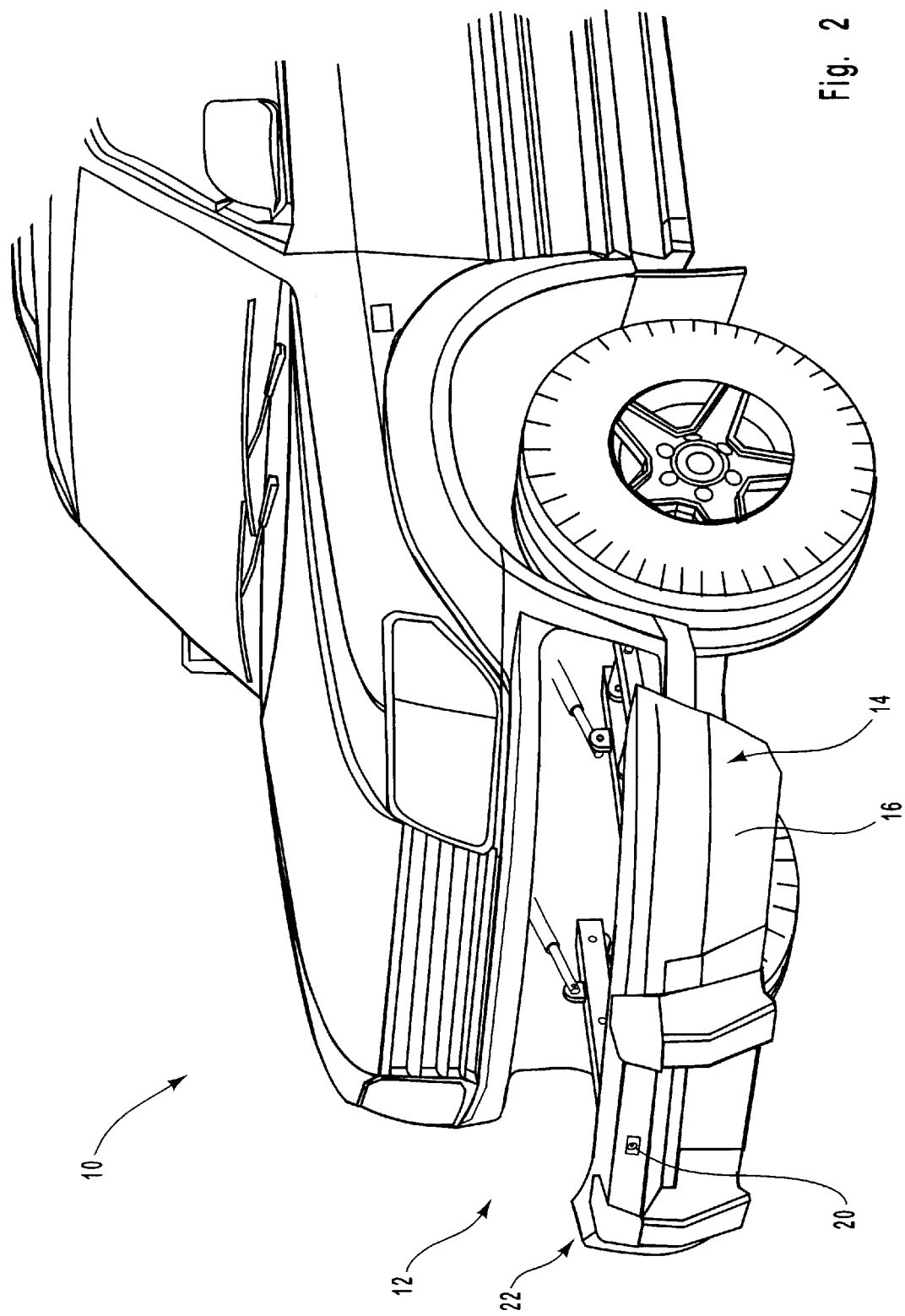
FIG. 2 is a perspective view of the motor vehicle of FIG. 1 in which the bumper has been moved from the standard position to an activated position.

As described previously, the linkage permits the bumper 14 to be moved from the standard position 18 under some circumstances. FIG. 2 is a perspective view of the motor vehicle 10 of FIG. 1 in which the bumper 14 has been moved from the standard position 18 to an activated position 22.

In the activated position 22 shown in FIG. 2, the bumper 14 is horizontally displaced from the standard position 18 in a direction away from the motor vehicle 10. Extending the bumper 14 in this manner allows the crash sensor 20 to provide early detection of a collision involving the motor vehicle 10. This also enables the bumper 14 to crush and absorb energy prior to the remaining portion of the motor vehicle 10 impacting a target.

In the activated position 22 shown in FIG. 2, the bumper 14 is also downwardly displaced from the standard position 18. Lowering the bumper 14 in this manner enables the motor vehicle 10 to engage a target at a lower impact point. This may be advantageous in a collision situation where the striking vehicle is elevated with respect to a target vehicle, for example when a sport utility vehicle strikes a smaller compact car. In such a collision, the difference in height between the striking vehicle and the target vehicle typically causes a horizontal base member, or sill, of the striking vehicle to hit the side of the target vehicle at the height of the passenger compartment. This may cause the side of the target vehicle to be strongly deformed into the passenger compartment. Lowering the bumper 14 of the striking vehicle may reduce the likelihood of such intrusion into the passenger compartment of the target vehicle.

FIG. 3A is a side plan view of an exemplary linkage 24 for attaching the bumper 14 to the motor vehicle 10. In FIG. 3A, the linkage 24 is shown retaining the bumper 14 in the standard position 18. As shown, the linkage 24 includes a shaft 26. The shaft 26 is rigidly attached to the bumper 14 and pivotally attached to the frame 28 of the motor vehicle 10. In particular, a first frame pivot pin 30 is used to attach the first mounting bracket 32 to the frame 28 of the motor vehicle 10, and a second frame pivot pin 34 is used to attach the second mounting bracket 36 to the frame 28 of the motor vehicle 10. In addition, a first shaft pivot pin 38 is used to attach the first mounting bracket 32 to the shaft 26, and a second shaft pivot pin 40 is used to attach the second mounting bracket 36 to the shaft 26.

As described previously, the linkage 24 permits the bumper 14 to be moved from the standard position 18 under some circumstances. In the embodiment shown in FIG. 3A, the first mounting bracket 32 pivots about the first frame pivot pin 30 and the first shaft pivot pin 38, and the second mounting bracket 36 pivots about the second frame pivot pin 34 and the second shaft pivot pin 40. Thus, the position of the bumper 14 may be adjusted in both a horizontal direction and a vertical direction.

FIG. 3B is a side plan view of the linkage 24 of FIG. 3A in which the bumper 14 is shown in an activated position 22.

In the activated position 22 shown in FIG. 3B, the bumper 14 is horizontally displaced from the standard position 18 in a direction away from the motor vehicle 10. The bumper 14 is also downwardly displaced from the standard position 18. Movement of the bumper 14 may be accomplished by an actuator (not shown). Many different types of actuators may be used, including an electric motor, a pneumatic actuator, a hydraulic actuator, a magnetic actuator, and the like.

Figure 4:
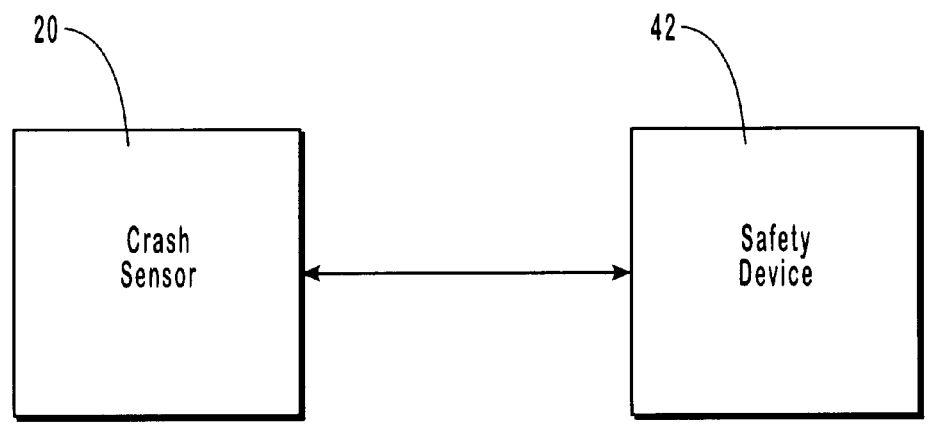
FIG. 4 is a functional block diagram illustrating the crash sensor on the impact surface of the bumper in electronic communication with a safety device.

FIG. 4 is a functional block diagram illustrating the crash sensor 20 on the impact surface 16 of the bumper 14 in electronic communication with a safety device 42. As described previously, the crash sensor 20 detects a collision involving the motor vehicle 10. In some embodiments, once the crash sensor 20 detects a collision, one or more safety devices 42 may be deployed. One example of a safety device 42 that may be deployed is an airbag, such as a driver airbag, a passenger airbag, a side-impact airbag, or the like. Another example of a safety device 42 that may be deployed is an inflatable structure that is located behind the bumper 14. Those skilled in the art will recognize numerous other types of safety devices 42 that may be deployed once the crash sensor 20 detects a collision involving the motor vehicle 10.

In some embodiments, the bumper 14 may be automatically moved from the standard position 18 to the extended position 22 when the motor vehicle 10 exceeds a certain speed. Similarly, the bumper 14 may be automatically moved from the extended position 22 back to the standard position 18 when the motor vehicle 10 decreases below the threshold speed.

Figure 5:
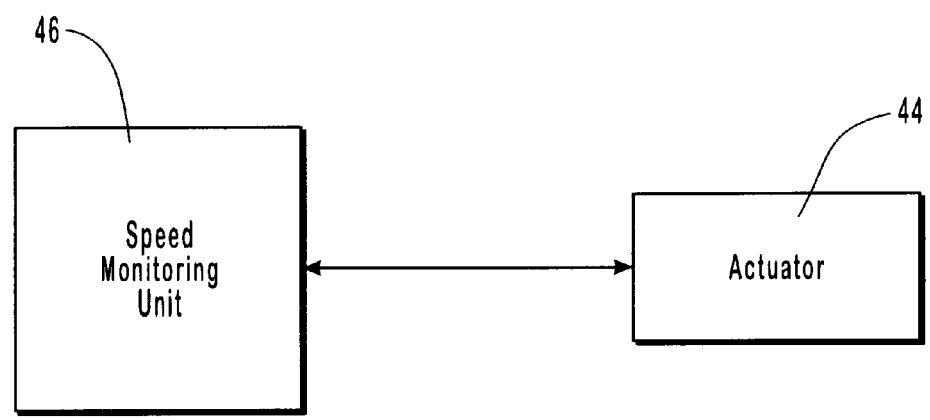
FIG. 5 is a functional block diagram illustrating an actuator in electronic communication with a speed monitoring unit.

FIG. 5 is a functional block diagram illustrating an actuator 44 in electronic communication with a speed monitoring unit 46. The speed monitoring unit 46 monitors the speed of the motor vehicle 10. When the speed of the motor vehicle 10 increases above a threshold value, the speed monitoring unit 46 sends an activation signal to the actuator 44. In response, the actuator 44 moves the bumper 14 from the standard position 18 to the activated position 22. When the speed of the motor vehicle 10 decreases below the threshold value, the speed monitoring unit 46 sends a deactivation signal to the actuator 44. In response, the actuator 44 moves the bumper 14 from the activated position 22 back to the standard position 18.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A bumper assembly mountable to a motor vehicle, comprising:
    a movable bumper having an impact surface that receives the impact of a collision involving the motor vehicle;
    a crash sensor attached to the movable bumper; and
    a linkage for attaching the movable bumper to the motor vehicle such that the movable bumper is movable from a first position to a second position, said second position being horizontally displaced from the first position in a direction away from the motor vehicle.

2. The bumper assembly of claim 1, wherein the crash sensor is attached to the impact surface of the movable bumper.

3. The bumper assembly of claim 1, wherein the second position is downwardly displaced from the first position.

4. The bumper assembly of claim 1, wherein the crash sensor effects deployment of a safety device upon detection of a collision involving the motor vehicle.

5. The bumper assembly of claim 1, further comprising an actuator that moves the movable bumper from the first position to the second position.

6. The bumper assembly of claim 5, wherein the actuator moves the movable bumper from the first position to the second position when the motor vehicle accelerates above a threshold speed.

7. The bumper assembly of claim 6, wherein the actuator moves the movable bumper from the second position to the first position when the motor vehicle decelerates below the threshold speed.

8. The bumper assembly of claim 1, wherein the linkage comprises a shaft that is rigidly attached to the movable bumper and that is pivotally attachable to a frame of the motor vehicle.

9. A bumper assembly mountable to a motor vehicle, comprising:
    a movable bumper having an impact surface that receives the impact of a collision involving the motor vehicle;
    a crash sensor attached to the movable bumper;
    a linkage for attaching the movable bumper to the motor vehicle such that the movable bumper is movable from a first position to a second position, said second position being horizontally displaced from the first position in a direction away from the motor vehicle, said second position also being downwardly displaced from the first position; and
    an actuator that moves the movable bumper from the first position to the second position.

10. The bumper assembly of claim 9, wherein the crash sensor is attached to the impact surface of the movable bumper.

11. The bumper assembly of claim 9, wherein the crash sensor effects deployment of a safety device upon detection of a collision involving the motor vehicle.

12. The bumper assembly of claim 9, wherein the actuator is in electronic communication with a speed monitoring unit, wherein the speed monitoring unit sends an activation signal to the actuator when the motor vehicle accelerates above the threshold speed, and wherein the activation signal causes the actuator to move the movable bumper from the first position to the second position.

13. The bumper assembly of claim 12, wherein the speed monitoring unit sends a deactivation signal to the actuator when the motor vehicle decelerates below the threshold speed, and wherein the deactivation signal causes the actuator to move the movable bumper from the second position to the first position.

14. The bumper assembly of claim 9, wherein the linkage comprises a shaft that is rigidly attached to the movable bumper and that is pivotally attachable to a frame of the motor vehicle.

15. A bumper assembly mountable to a motor vehicle, comprising:
    a movable bumper having an impact surface that receives the impact of a collision involving the motor vehicle;
    means for sensing the collision, wherein the sensing means are attached to the movable bumper; and means for attaching the movable bumper to the motor vehicle such that the movable bumper is movable from a first position to a second position, said second position being horizontally displaced from the first position in a direction away from the motor vehicle.

16. The bumper assembly of claim 15, wherein the sensing means are attached to the impact surface of the movable bumper.

17. The bumper assembly of claim 15, wherein the second position is downwardly displaced from the first position.

18. The bumper assembly of claim 15, further comprising means for effecting deployment of a safety device in response to sensing the collision.

19. The bumper assembly of claim 15, further comprising means for moving the movable bumper from the first position to the second position.

20. The bumper assembly of claim 19, wherein the movable bumper is moved from the first position to the second position when the motor vehicle accelerates above a threshold speed.

21. The bumper assembly of claim 20, wherein the movable bumper is moved from the second position to the first position when the motor vehicle decelerates below the threshold speed.

* * * * *